United States Patent Office 2,966,520
Patented Dec. 27, 1960

2,966,520

PRODUCTION OF BIS-CHLOROMETHYL BISULPHIDE

Maurice Joullié, Saint-Germain-en-Laye, Michel Laurre, Chatillon-sous-Bagneux, Gabriel Maillard, Puteaux, and Pierre Muller, Paris, France, assignors to Recherches et Propagande Scientifiques, Paris, France, a company of France No Drawing. Filed May 5, 1958, Ser. No. 732,806

Claims priority, application France May 6, 1957

9 Claims. (Cl. 260—608)

This invention relates to the manufacture of bis-chloromethyl bisulphide.

In our United States patent application Serial No. 633,361, filed June 4, 1957, we have described a process for the production of bis-chloromethyl bisulphide from trithiane and sulphurmonochloride or sulphuryl chloride in the presence of bis-chloromethyl monosulphide. This process gives satisfactory yields, but a tarry residue is formed in the course of the reaction.

It has been reported (Douglass, Martin and Addor, J. Org. Chem., 1951, 16, 1301) that bis-chloromethyl bisulphide can be obtained by the reaction of thio-phenol with chloromethyl sulphenyl chloride in dichloromethane, but the yield obtained was only 11%. In any case thiophenol is a somewhat expensive reagent.

It is an object of the present invention to provide a method of making bis-chloromethyl bisulphide in which no tarry residue is formed. A further object is to provide a process in which the bis-chloromethyl bisulphide is obtained in good yield, and which does not make use of expensive raw materials. A still further object is to provide a process in which a by-product can be employed in the production of further bis-chloromethyl bisulphide.

According to the invention bis-chloromethyl bisulphide is made by causing chloromethyl sulphenyl chloride and methyl mercaptan to react in a reaction medium consisting of water or aqueous methanol containing more than 50% by volume of water.

It has been found that under these conditions both bis-chloromethyl bisulphide and methyl bisulphide are formed without the production of a tarry residue, apparently in accordance with the equation

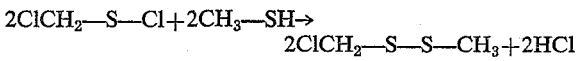

In addition, it has been found that by operating at a low or moderate temperature, it is possible to obtain good yields, e.g. about 50% or more of theoretical, of bis-chloromethyl bisulphide.

A further advantage of the new process is that the by-product of bis-methyl bisulphide is a starting material for the preparation of chloromethyl sulphenyl chloride, into which it is converted by the action of chlorine. It is thus possible to reintroduce this bisulphide into the cycle of production.

In carrying out the reaction, the reactants may be introduced into the reaction medium in either order or simultaneously, but the best results are obtained by first dispersing the chloromethyl sulphenyl chloride in the reaction medium and then gradually introducing the methyl mercaptan into the cooled and agitated dispersion.

The reactants may be employed in equimolecular proportions, but it has proven advantageous to use a slight molecular excess of methyl mercaptan.

Generally speaking, the reaction can be carried out at room temperature or below, temperatures of about −20° to +20° C. being very useful. In any case, the decomposition temperature of chloromethyl sulphenyl chloride (50° C.) should not be reached.

As the reaction medium it is preferred to use a mixture of water and methanol containing 60–90% by volume of water and 40–10% by volume of methanol. Most advantageously the reaction is carried out at a temperature between −10° and +20° C. in a reaction medium containing 60–63% by volume of water and 40–37% by volume of methanol.

In the course of the reaction, a little methyl chloromethyl bisulphide may be formed, presumably in accordance with the equation

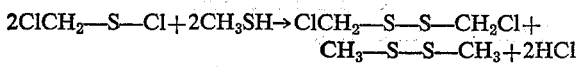

In order to separate the constituents of the crude product, the latter may be extracted with a substantially non-polar solvent which is immiscible with the reaction medium, for example petroleum ether, dimethyl ether, diethyl ether, benzene, cyclohexane, dioxane, or toluene, which will dissolve the bis-methyl bisulphide. The extract and the residue may then be separately treated, for example by distillation, to isolate the bis-methyl bisulphide and the bis-chloromethyl bisulphide respectively.

The following example illustrates the invention.

*Example*

A mixture composed of 62.5 cc. of water and 37.5 cc. of methanol is introduced into a spherical 250 cc. flask provided with a mechanical stirring device, a thermometer, an inlet tube and a dropping funnel. This mixture is stirred and its temperature is lowered to −10° C. by means of a cooling bath.

Without stopping the stirring, 35 g. of chloromethyl sulphenyl chloride are then introduced through the dropping funnel over a period of 5 minutes, so that the temperature does not rise above about 0° C.

The dropping funnel is then replaced by an inlet tube extending to the bottom of the flask, through which there is introduced, still with stirring, a current of methyl mercaptan, the rate of introduction being so adjusted that the temperature is maintained between 0° and 5° C. About 15 minutes will usually be required for the introduction of 15 g. of methyl mercaptan, which is a slight molecular excess over the chloromethyl sulphenyl chloride. The evolution of heat is rapid at the beginning but falls off rapidly towards the end of the reaction.

When the 15 g. of methyl mercaptan has been fed, the stirring is stopped and the contents of the flask are transferred into a decanting funnel. The product formed is twice extracted with 30 cc. of petroleum ether. The ethereal extracts are dried over anhydrous sodium sulphate.

The solvent is distilled off from the residue from the extraction under a pressure of 100 mm. Hg, and distillation is continued under a still lower pressure. The methyl chloromethyl bisulphide comes over first, and then the bis-chloromethyl bisulphide. There are recovered 11.5 g. of methyl chloromethyl bisulphide, boiling at 73° C. under 33 mm. Hg and 15 g. of bis-chloromethyl bisulphide boiling at 96° C. under 15 mm. Hg. The yield of bis-chloromethyl bisulphide is 60%.

The bis-methyl bisulphide is separated from the petroleum ether by fractionation under atmospheric pressure. There are obtained 8 g. of bisulphide boiling at 117° C. under 760 mm. of mercury.

Analysis of the bis-chloromethyl bisulphide gave:

| Calculated | Found |
|---|---|
| C%=14.73 | C%=15.25–15.45 |
| H%=2.45 | H%=2.51–2.57 |
| S%=39.26 | S%=38.80–38.63 |
| Cl%=43.56 | Cl%=43.50–43.60 |

Analysis of the methyl chloromethyl bisulphide gave:

| Calculated | Found |
|---|---|
| C%=18.67 | C%=19.25–19.38 |
| H%=3.88 | H%=3.95–3.90 |
| S%=49.80 | S%=49.40–49.50 |
| Cl%=27.62 | Cl%=27.80–27.90 |

Analysis of the bis-methyl bisulphide gave:

| Calculated | Found |
|---|---|
| C%=25.53 | C%=25.44–25.36 |
| H%=6.39 | H%=6.40–6.42 |
| S%=68.09 | S%=67.90–67.96 |

We claim:

1. Process for the production of bis-chloromethyl bisulphide, which comprises effecting reaction at a low temperautre between chloromethyl sulphenyl chloride and methyl mercaptan in an ionizing reaction medium selected from the group which consists of water and aqueous methanol containing more than 50% by volume of water, thereby providing an acid condition in said medium as a result of the production of hydrochloric acid from the reaction between chloromethyl sulphenyl chloride and methyl mercaptan.

2. Process for the production of bis-chloromethyl bisulphide, which comprises effecting reaction at a low temperature between chloromethyl sulphenyl chloride and methyl mercaptan in an ionizing reaction medium consisting of aqueous methanol containing 60–90% by volume of water, thereby providing an acid condition in said medium as a result of the production of hydrochloric acid from the reaction between chloromethyl sulphenyl chloride and methyl mercaptan.

3. Process for the production of bis-chloromethyl bisulphide, which comprises effecting reaction at a temperature of −20° to +20° C. between chloromethyl sulphenyl chloride and methyl mercaptan in an ionizing reaction medium consisting of aqueous methanol containing 60–90% by volume of water, thereby providing an acid condition in said medium as a result of the production of hydrochloric acid from the reaction between chloromethyl sulphenyl chloride and methyl mercaptan.

4. Process for the production of bis-chloromethyl bisulphide, which comprises effecting reaction at a temperature of −10° to +20° C. between chloromethyl sulphenyl chloride and methyl mercaptan in an ionizing reaction medium consisting of aqueous methanol containing 60–63% by volume of water, thereby providing an acid condition in said medium as a result of the production of hydrochloric acid from the reaction between chloromethyl sulphenyl chloride and methyl mercaptan.

5. Process for the production of bis-chloromethyl bisulphide, which comprises dispersing chloromethyl sulphenyl chloride in an ionizing reaction medium consisting of aqueous methanol containing 60–90% by volume of water, and while cooling and agitating the resulting dispersion adding to it methyl mercaptan in slight excess over the chloromethyl sulphenyl chloride while maintaining the temperature between −10° and +20° C., thereby providing an acid condition in said medium as a result of the production of hydrochloric acid from the reaction between chloromethyl sulphenyl chloride and methyl mercaptan.

6. Process for the production of bis-chloromethyl bisulphide, which comprises dispersing chloromethyl sulphenyl chloride in an ionizing reaction medium consisting of aqueous methanol containing 60–63% by volume of water, and while cooling and agitating the resulting dispersion adding to it methyl mercaptan in slight excess over the chloromethyl sulphenyl chloride while maintaining the temperature between −10° and +20° C., thereby providing an acid condition in said medium as a result of the production of hydrochloric acid from the reaction between chloromethyl sulphenyl chloride and methyl mercaptan.

7. Process according to claim 1, which comprises also extracting bis-methyl bisulphide formed as a by-product from the crude product of the reaction by means of a substantially non-polar solvent which is immiscible with the reaction medium, and removing first reaction medium, then any methyl chloromethyl bisulphide formed, and finally bis-chloromethyl bisulphide from the residue by distillation under reduced pressure.

8. Process according to claim 5, which comprises extracting bis-methyl bisulphide formed as a by-product from the crude product of the reaction by means of a substantially non-polar solvent which is immiscible with the reaction medium, and removing first reaction medium, then any methyl chloromethyl bisulphide formed, and finally bis-chloromethyl bisulphide from the residue by distillation under reduced pressure.

9. Process according to claim 6, which comprises also extracting bis-methyl bisulphide formed as a by-product from the crude product of the reaction by means of a substantially non-polar solvent which is immiscible with the reaction medium, and removing first reaction medium, then any methyl chloromethyl bisulphide formed, and finally bis-chloromethyl bisulphide from the residue by distillation under reduced pressure.

References Cited in the file of this patent

UNITED STATES PATENTS 2,521,870    Proell _____ Sept. 12, 1950

FOREIGN PATENTS 681,711    Great Britain _____ Oct. 29, 1952

OTHER REFERENCES

Douglass et al.: Jr. Org. Chem 16, 1301 (1951).